United States Patent
Huang et al.

(10) Patent No.: US 11,954,824 B2
(45) Date of Patent: Apr. 9, 2024

(54) IMAGE PRE-PROCESSING METHOD AND IMAGE PROCESSING APPARATUS FOR FUNDOSCOPIC IMAGE

(71) Applicant: Acer Medical Inc., New Taipei (TW)

(72) Inventors: Yi-Jin Huang, New Taipei (TW); Chin-Han Tsai, New Taipei (TW); Ming-Ke Chen, New Taipei (TW)

(73) Assignee: Acer Medical Inc., New Taipei (TW)

( * ) Notice: Subject to any disclaimer, the term of this patent is extended or adjusted under 35 U.S.C. 154(b) by 304 days.

(21) Appl. No.: 17/235,938

(22) Filed: Apr. 21, 2021

(65) Prior Publication Data
US 2022/0301111 A1   Sep. 22, 2022

(30) Foreign Application Priority Data
Mar. 19, 2021   (TW) ................. 110109989

(51) Int. Cl.
*G06T 5/00*   (2006.01)
*G06K 9/32*   (2006.01)
(Continued)

(52) U.S. Cl.
CPC ............. *G06T 5/002* (2013.01); *G06N 20/00* (2019.01); *G06T 5/50* (2013.01); *G06T 7/0012* (2013.01);
(Continued)

(58) Field of Classification Search
CPC ......... G06T 5/002; G06T 5/50; G06T 7/0012; G06T 2207/20081; G06T 2207/30041; G06T 2207/30096; G06T 7/10; G06T 7/174; G06T 5/00; G06T 2207/20172; G06T 2207/00; G06N 20/00; G06V 10/25; G06V 30/147; G06V 10/34; G06F 18/00
See application file for complete search history.

(56) References Cited

U.S. PATENT DOCUMENTS

| | | | |
|---|---|---|---|
| 9,002,085 | B1 | 4/2015 | Solanki et al. |
| 2005/0169553 | A1 | 8/2005 | Maurer |

(Continued)

FOREIGN PATENT DOCUMENTS

| | | |
|---|---|---|
| CN | 111833334 | 10/2020 |
| JP | H09206278 | 8/1997 |

(Continued)

OTHER PUBLICATIONS

Walter Thomas et al., "Automatic Detection of Microaneurysms in Color Fundus Images of the Human Retina by Means of the Bounding Box Closing", Springer International Publishing, Oct. 10, 2002, pp. 1-14.

(Continued)

*Primary Examiner* — Edward F Urban
*Assistant Examiner* — Duy Tran
(74) *Attorney, Agent, or Firm* — JCIPRNET

(57) ABSTRACT

An image pre-processing method and an image processing apparatus for a fundoscopic image are provided. A region of interest (ROI) is obtained from a fundoscopic image to generate a first image. The ROI is focused on an eyeball in the fundoscopic image. A smoothing process is performed on the first image to generate a second image. A value difference between neighboring pixels in the second image is increased to generate a third image.

14 Claims, 3 Drawing Sheets

(51) Int. Cl.
  *G06N 20/00* (2019.01)
  *G06T 5/50* (2006.01)
  *G06T 7/00* (2017.01)
  *G06V 10/25* (2022.01)

(52) U.S. Cl.
  CPC .... *G06V 10/25* (2022.01); *G06T 2207/20081* (2013.01); *G06T 2207/30041* (2013.01); *G06T 2207/30096* (2013.01)

(56) References Cited

U.S. PATENT DOCUMENTS

| | | | |
|---|---|---|---|
| 2006/0147094 A1* | 7/2006 | Yoo | G06V 40/19 382/117 |
| 2007/0248277 A1 | 10/2007 | Scrofano et al. | |
| 2008/0317339 A1* | 12/2008 | Steinberg | G06V 40/193 382/167 |
| 2015/0110368 A1* | 4/2015 | Solanki | G16H 30/20 382/128 |
| 2017/0076146 A1* | 3/2017 | Saripalle | G06V 40/172 |
| 2019/0236803 A1* | 8/2019 | Wang | G06V 40/18 |

FOREIGN PATENT DOCUMENTS

| | | | |
|---|---|---|---|
| JP | 2004046329 | | 2/2004 |
| JP | 2004046329 A | * | 2/2004 |
| JP | 2006095009 | | 4/2006 |
| JP | 2006263127 | | 10/2006 |
| JP | 2007117154 | | 5/2007 |
| JP | 2015051054 | | 3/2015 |
| WO | 2019013779 | | 1/2019 |

OTHER PUBLICATIONS

Besenczi Renátó et al., "A review on automatic analysis techniques for color fundus photographs", Computational and Structural Biotechnology Journal, Oct. 6, 2016, pp. 371-384.

"Search Report of Europe Counterpart Application", dated Mar. 3, 2022, p. 1-p. 12.

* cited by examiner

IMAGE PRE-PROCESSING METHOD AND IMAGE PROCESSING APPARATUS FOR FUNDOSCOPIC IMAGE

CROSS-REFERENCE TO RELATED APPLICATION

This application claims the priority benefit of Taiwanese application serial no. 110109989, filed on Mar. 19, 2021. The entirety of the above-mentioned patent application is hereby incorporated by reference herein and made a part of this specification.

BACKGROUND

Technical Field

The disclosure relates to an image processing technology, and particularly relates to an image pre-processing method and an image processing apparatus for a fundoscopic image.

Description of Related Art

Medical images are images taken of specific parts of organisms, and these images may be used to assess the risk or severity of a disease. For example, through fundoscopic photographic examinations, diseases such as retinopathy, glaucoma, macular disease or the like may be detected early. Generally speaking, most doctors judge lesions in the medical images manually. Although computer-assisted evaluation of medical images is now possible, breakthroughs are needed in terms of indicators such as efficiency, complexity, and accuracy.

SUMMARY

Embodiments of the disclosure provide an image pre-processing method and an image processing apparatus for a fundoscopic image, in which features can be enhanced, thereby improving accuracy of subsequent identification of lesions or other features.

The image pre-processing method according to an embodiment of the disclosure includes (but is not limited to) the following steps. A region of interest is obtained from a fundoscopic image to generate a first image. The region of interest is focused on an eyeball in the fundoscopic image. A smoothing process is performed on the first image to generate a second image. A value difference between multiple neighboring pixels is increased to generate a third image. The third image is used for image recognition.

The image processing apparatus according to an embodiment of the disclosure includes (but is not limited to) a storage and a processor. The storage stores a code. The processor is coupled to the storage. The processor loads and executes the code to be configured to obtain a region of interest from a fundoscopic image to generate a first image, perform a smoothing process on the first image to generate a second image, and increase a value difference between multiple neighboring pixels in the second image to generate a third image. The region of interest is focused on an eyeball in the fundoscopic image. The third image is used for image recognition.

Based on the above, according to the image pre-processing method and the image processing apparatus for a fundoscopic image according to the embodiments of the disclosure, before image recognition is performed, the region of interest is cut out from an initial fundoscopic image, and the smoothing process and value enhancement are further performed. In this way, features may be enhanced, noises may be reduced, and accuracy of the subsequent image recognition may be improved.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
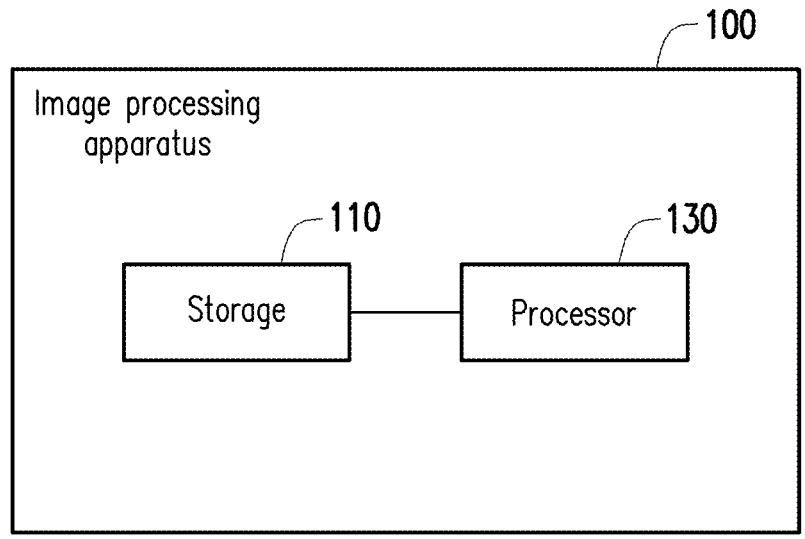
FIG. 1 is a block diagram of components of an image processing apparatus according to an embodiment of the disclosure.

FIG. 1 is a block diagram of components of an image processing apparatus 100 according to an embodiment of the disclosure. Referring to FIG. 1, the image processing apparatus 100 includes (but is not limited to) a storage 110 and a processor 130. The image processing apparatus 100 may be a desktop computer, a notebook computer, a smart phone, a tablet computer, a server, a medical testing instrument, or other computing apparatuses.

The storage 110 may be any type of fixed or removable random access memory (RAM), read only memory (ROM), flash memory, hard disk drive (HDD), solid-state drive (SSD) or similar components. In one embodiment, the storage 110 is configured to record a code, a software module, a configuration, data (for example, an image, a value, a reference value, a distance, etc.) or a file, and the embodiments thereof will be described in detail later.

The processor 130 is coupled to the storage 110. The processor 130 may be a central processing unit (CPU), a graphic processing unit (GPU), or other programmable general-purpose or special-purpose microprocessor, digital signal processor (DSP), programmable controller, field programmable gate array (FPGA), application-specific integrated circuit (ASIC), neural network accelerator or other similar components or a combination of the above components. In one embodiment, the processor 130 is configured to execute all or part of operations of the image processing apparatus 100, and may load and execute each code, the software module, the file, and the data recorded by the storage 110.

Hereinafter, the method according to the embodiments of the disclosure will be described with reference to each apparatus, component, and module in the image processing apparatus 100. Each process of the method may be adjusted according to actual implementation, and is not limited to those described herein.

Figure 2:
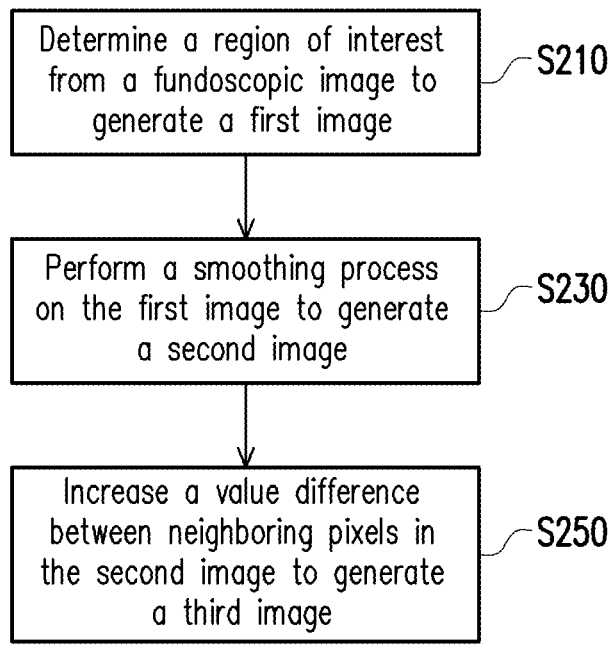
FIG. 2 is a flowchart of an image pre-processing method according to an embodiment of the disclosure.

FIG. 2 is a flowchart of an image pre-processing method according to an embodiment of the disclosure. Referring to FIG. 2, the processor 130 may obtain a region of interest from a fundoscopic image to generate a first image (step S210). Specifically, the fundoscopic image is an image obtained by fundoscopic photography of a human or other organism. The processor 130 may obtain the fundoscopic image through a built-in or external image capturing apparatus, or the processor 130 may download the fundoscopic image from a server, a computer, or a storage medium. It should be noted that fundoscopic images from different sources may have different shapes or sizes. In order to normalize these fundoscopic images, the processor 130 may first cut out the region of interest considered as important or useful information.

The region of interest according to the embodiments of the disclosure is focused on an eyeball in the fundoscopic image. In one embodiment, the processor 130 may locate a center of the eyeball from the fundoscopic image. For example, the processor 130 may take a point where the most straight lines in a gradient direction of pixels intersect in the fundoscopic image as a position of the eyeball. For another example, the processor 130 may perform the Hough transformation on the fundoscopic image to select a circle that best meets the requirements, and determine a center of circle of a contour of the region of interest accordingly. The processor 130 may further determine the region of interest according to the center of the eyeball. For example, the processor 130 may set a circle that relatively or most conforms to the contour of the eyeball according to the center, and use the contour of the circle as a boundary of the region of interest. For another example, a circle obtained by the Hough transformation may be used as the region of interest by the processor 130.

In another embodiment, the processor 130 may search for a boundary of the eyeball from the outside to the center of the fundoscopic image. For example, the processor 130 scans the fundoscopic image sequentially from four sides toward the center, and determines lightness of a scanned region. It should be noted that a lightness value (or brightness, that is, the lightness of a color) on one side of the boundary of the eyeball is higher than the other side of the boundary of the eyeball. Generally speaking, a region outside the eyeball in the fundoscopic image has a low lightness value and may be in black. When a lightness difference between neighboring pixels on any side is higher than a difference threshold, or the lightness value of one or more pixels is higher than a lightness threshold (that is, the lightness value on one side is higher than that on the other side), the processor 130 may determine that an outermost edge of the region of interest on this side has been found. The processor 130 may use the outermost edges respectively found on the four sides of the fundoscopic image as boundary lines. That is, a quadrilateral is formed. The processor 130 may use a length of a shortest side of the quadrilateral as a diameter of a circle (taken as the eyeball), and use the circle formed by the diameter as the boundary of the eyeball. The center of the circle is the center of the quadrilateral. In another embodiment, in order to first filter out interference that often appears on a periphery, the processor 130 multiplies half the length of the shortest side of the quadrilateral by a floating point number greater than 0 and less than 1 to obtain a radius length, and uses the radius length to obtain a circle. In addition, the center of the circle is still at the center of the quadrilateral. Then, the processor 130 may determine the region of interest according to the boundary of the eyeball. That is, the boundary of the eyeball is taken as the boundary of the region of interest.

In one embodiment, the processor 130 may cut out the region of interest from the fundoscopic image. That is, the processor 130 may delete a region in the fundoscopic image that is not the region of interest. The processor 130 may further add a background color outside the region of interest to form the first image. This background color will be considered as useless information in subsequent image recognition (for example, for lesion identification or for severity identification) of the fundoscopic image. The useless information may be excluded by feature extraction or may have a relatively low value. For example, red, green and blue background colors all consist of values of 128, 64, or 0, but are not limited thereto. In addition, the size, shape, and/or ratio of the first image may be fixed, thereby normalizing different fundoscopic images. In some embodiments, the circle may be changed to an ellipse or other geometric figures.

Figure 3:
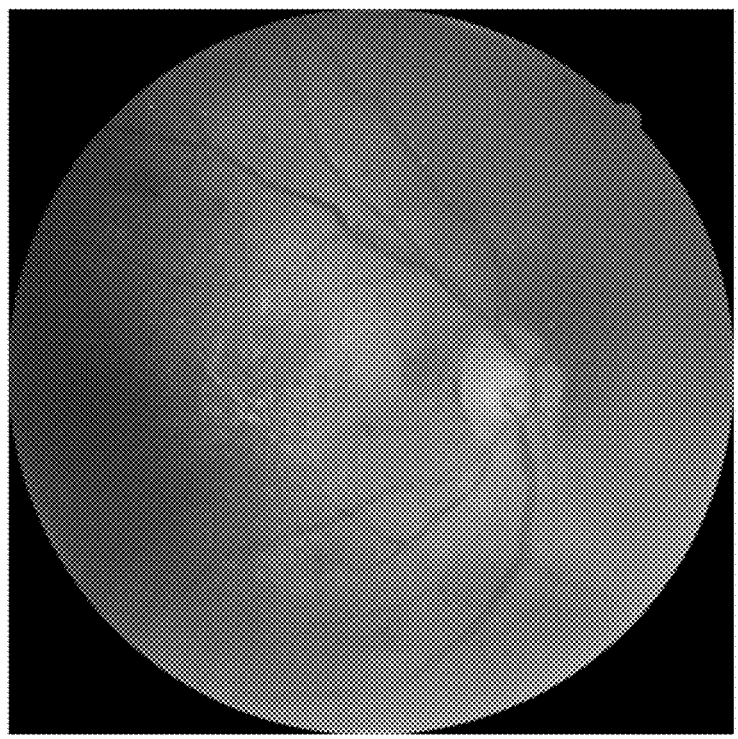
FIG. 3 is a schematic diagram of a first image according to an embodiment of the disclosure.

For example, FIG. 3 is a schematic diagram of the first image according to an embodiment of the disclosure. Referring to FIG. 3, a circular region (i.e., the region of interest) shown in the figure corresponds to the eyeball.

The processor 130 may perform a smoothing process on the first image to generate a second image (step S230). Specifically, the smoothing process is a spatial domain filtering technology capable of directly blurring a pixel in an image and removing noises. For example, a value difference (also referred to as distance) between neighboring pixels may be reduced.

In one embodiment, the smoothing process is Gaussian blur. The processor 130 may perform Gaussian blur on the first image. For example, the processor 130 performs a convolution operation on each pixel in the first image by using a Gaussian convolution kernel, and then sums convolution results to obtain the second image.

Figure 4:
FIG. 4 is a schematic diagram of a second image according to an embodiment of the disclosure.

For example, FIG. 4 is a schematic diagram of the second image according to an embodiment of the disclosure. Referring to FIG. 3 and FIG. 4, compared with FIG. 3, FIG. 4 shows that details of some noises are blurred by Gaussian blur, while edges of blood vessels, macula, veins and/or arteries remain visible.

In other embodiments, the smoothing processing may also be median filtering, mean filtering, box filtering or other processing.

The processor 130 may increase a value difference between multiple neighboring pixels in the second image to generate a third image (step S250). Specifically, the smoothing process may narrow the value difference between the neighboring pixels. In order to further enhance a feature, in one embodiment, the processor 130 may increase (i.e., update or change) the value difference in proportion to a distance between the value difference between the neighboring pixels and a reference value. For example, when the reference value is 128, the processor 130 may calculate an original value difference of red, green, and blue channel values between each pixel and its neighboring pixel, and compare the distances between the original value differences and the reference value. As the distance is increased, the processor 130 may increase the magnitude of an increase in the value difference. As the distance is reduced, the processor 130 may reduce the magnitude of an increase in the value difference. The proportion may be 1, 2, 5, or 10 times. Then, according to an increased value difference (i.e., updated value difference), the processor 130 may change the values of the corresponding pixels so that the value difference between two pixels matches the updated value difference.

In some embodiments, a value to be changed has an upper limit or lower limit. For example, the upper limit may be 255 and the lower limit may be 0. When the changed value exceeds the upper limit or the lower limit, it may be set as a specific value (for example, the upper limit, the lower limit or other values).

It should be noted that a mathematical relationship between the original value difference and the updated value difference is not limited to a proportional relationship. In other embodiments, the processor 130 may also adopt a linear relationship, an exponential relationship, or other mathematical relationships depending on actual needs.

Figure 5:
FIG. 5 is a schematic diagram of a third image according to an embodiment of the disclosure.

For example, FIG. 5 is a schematic diagram of the third image according to an embodiment of the disclosure. Referring to FIG. 4 and FIG. 5, the blood vessels, the macula, the optic disc, the veins, the arteries or other objects in FIG. 5 are more clear.

It should also be noted that the third image according to the embodiments of the disclosure may be used for image recognition. In one embodiment, the processor 130 inputs the third image to a detection model based on a machine learning algorithm (for example, deep neural network (DNN), multi-layer perceptron (MLP), support vector machine (SVM) or other machine learning models). In one embodiment, the detection model may be used for image recognition. It should be noted that the third image may be used in pre-processing in a training phase and/or inference phase of the detection model. Generally speaking, in the detection model, an initial fundoscopic image is usually immediately subjected to feature extraction without undergoing image pre-processing. Through the image pre-processing according to the embodiments of the disclosure, a relatively accurate recognition result of an image of a lesion such as bleeding, exudates, and edema can be obtained. Alternatively, the image pre-processing according to the embodiments of the disclosure may facilitate identification of a part such as blood vessels, macula, or veins, but the disclosure is not limited to the above.

In another embodiment, the image recognition may be based on scale-invariant feature transform (SIFT), a Haar-like feature, AdaBoost, or other recognition technologies.

To sum up, in the image pre-processing method and the image processing apparatus for a fundoscopic image according to the embodiments of the disclosure, the region of interest in the fundoscopic image is determined, the smoothing process is performed on the image, and the value difference is increased. In this way, features may be enhanced, and the subsequent image recognition, model training, or other image applications may be facilitated.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An image pre-processing method, comprising:
    obtaining a region of interest from a fundoscopic image to generate a first image, wherein the region of interest is focused on an eyeball in the fundoscopic image;
    performing a smoothing process on the first image to generate a second image;
    comparing, for each pixel, a distance between value differences and a reference value, wherein the value differences are a first difference between a red channel value of the pixel and a neighboring pixel, a second difference between a green channel value of the pixel and the neighboring pixel, and a third difference between a blue channel value of the pixel and the neighboring pixel in the second image; and
    increasing the value differences according to the distance to generate a third image in which at least one of the red channel value, the green channel value, and blue channel value of pixels of the second image is changed, comprising:
        in response to the distance increasing, increasing a magnitude of an increase in the value differences;
        in response to the distance reducing, reducing the magnitude of the increase in the value differences;
        wherein the third image is used in pre-processing in at least one of a training phase and inference phase of a detection model based on a machine learning algorithm.

2. The image pre-processing method according to claim 1, wherein obtaining the region of interest from the fundoscopic image comprises:
    locating a center of the eyeball from the fundoscopic image; and
    determining the region of interest according to the center.

3. The image pre-processing method according to claim 1, wherein obtaining the region of interest from the fundoscopic image comprises:
    finding a boundary of the eyeball from an outside of the fundoscopic image, wherein a lightness value on one side of the boundary of the eyeball is higher than the lightness value on the other side of the boundary of the eyeball; and
    determining the region of interest according to the boundary of the eyeball.

4. The image pre-processing method according to claim 1, wherein generating the first image comprises:
    cutting out the region of interest from the fundoscopic image; and
    adding a background color outside the region of interest to form the first image.

5. The image pre-processing method according to claim 1, wherein the smoothing process is Gaussian blur, and performing the smoothing process on the first image comprises:
    performing the Gaussian blur on the first image.

6. The image pre-processing method according to claim 1, wherein increasing the value difference comprises:
    increasing the value difference in proportion to the distance between the value differences and the reference value.

7. The image pre-processing method according to claim 1, further comprising, after generating the third image:
    inputting the third image to the detection model based on the machine learning algorithm.

8. An image processing apparatus, comprising:
    a storage, storing a code; and
    a processor, coupled to the storage, loading and executing the code to be configured to:
        obtain a region of interest from a fundoscopic image to generate a first image, wherein the region of interest is focused on an eyeball in the fundoscopic image;
        perform a smoothing process on the first image to generate a second image;
        compare, for each pixel, a distance between value differences and a reference value, wherein the value differences are a first difference between a red channel value of the pixel and a neighboring pixel, a second difference between a green channel value of the pixel and the neighboring pixel, and a third difference between a blue channel value of the pixel and the neighboring pixel in the second image; and increase the value differences according to the distance to generate a third image in which at least one of the red channel value, the green channel value, and blue channel value of pixels of the second image is changed, comprising:
   in response to the distance increasing, increasing a magnitude of an increase in the value differences;
   in response to the distance reducing, reducing the magnitude of the increase in the value differences;
   wherein the third image is used in pre-processing in at least one of a training phase and inference phase of a detection model based on a machine learning algorithm.

9. The image processing apparatus according to claim 8, wherein the processor is further configured to:
   locate a center of the eyeball from the fundoscopic image; and
   determine the region of interest according to the center.

10. The image processing apparatus according to claim 8, wherein the processor is further configured to:
   find a boundary of the eyeball from an outside to a center of the fundoscopic image, wherein a lightness value on one side of the boundary of the eyeball is higher than the lightness value on the other side of the boundary of the eyeball; and
   determine the region of interest according to the boundary of the eyeball.

11. The image processing apparatus according to claim 8, wherein the processor is further configured to:
   cut out the region of interest from the fundoscopic image; and
   add a background color outside the region of interest to form the first image.

12. The image processing apparatus according to claim 8, wherein the smoothing process is Gaussian blur, and the processor is further configured to:
   perform the Gaussian blur on the first image.

13. The image processing apparatus according to claim 8, wherein the processor is further configured to:
   increase the value differences in proportion to the distance between the value difference and the reference value.

14. The image processing apparatus according to claim 8, wherein the processor is further configured to:
   input the third image to the detection model based on the machine learning algorithm.

\* \* \* \* \*